E. L. TAYLOR,

Assignor of one-fourth to W. D. ROWLAND.

Car Wheel.

No. 9,644. Reissued April 5, 1881.

Witnesses:
James F. Jobin.
David Williams.

Inventor
Enoch L. Taylor
by his Attorneys
Howson and Son

UNITED STATES PATENT OFFICE.

ENOCH L. TAYLOR, OF PHILADELPHIA, PENNSYLVANIA, ASSIGNOR OF ONE-FOURTH TO WM. DAY ROWLAND, OF SAME PLACE.

CAR-WHEEL.

SPECIFICATION forming part of Reissued Letters Patent No. 9,644, dated April 5, 1881.

Original No. 234,502, dated November 16, 1880. Application for reissue filed January 15, 1881.

*To all whom it may concern:*

Be it known that I, ENOCH L. TAYLOR, formerly of Pennsburg, Pennsylvania, but now of Philadelphia, Pennsylvania, did invent certain Improvements in Car-Wheels; and I do hereby declare that the following is a full, clear, and exact description of the same.

My invention relates to improvements in that class of car-wheels in which one portion of the wheel can turn on the other in traversing curves of the track, my improvements being too fully described hereinafter to need preliminary explanation.

Figure 1:
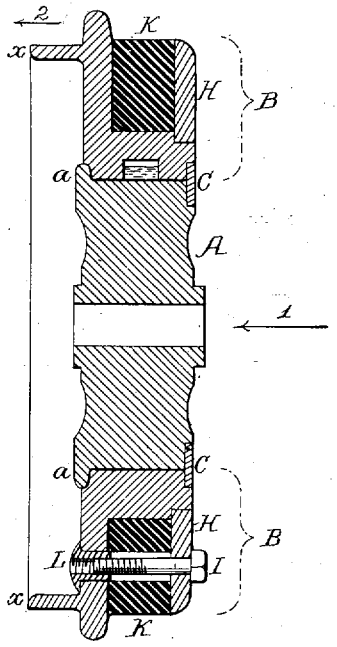
Figure 2:
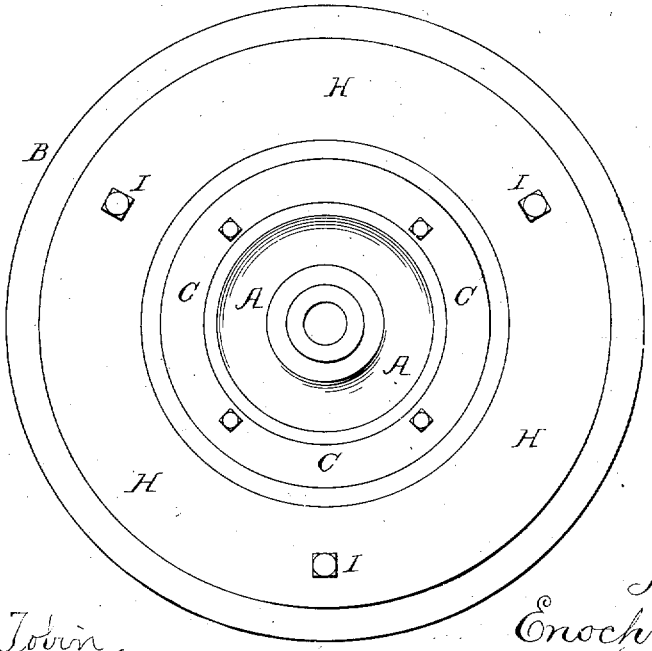

In the accompanying drawings, Figure 1 is a vertical section of my improved car-wheel; Fig. 2, a face view of the same, looking in the direction of the arrow 1, Fig. 1; and Fig. 3, a vertical section, showing a modification of my invention.

My improved car-wheel consists of two main parts—namely, the central flanged portion, A, which is secured to the axle, and the annular flanged portion B, which is fitted snugly to, but so that it can turn freely on, the central portion instead of dragging or jumping on the rails, as outer wheels, when constructed in the usual manner, must do in traversing curves.

I may state here that a wheel made of two parts so fitted together that the outer part can turn on the inner part is not new; but it will be observed that the flanges of the two portions of my improved wheel are on the same side, and that the bearing of the rim portion B on the hub A of the wheel is somewhat wider than the width of the tire, this extended bearing preventing any lateral twisting strain on the flange *a*, due to the thrust of the rail upon the flange of the rim in the direction of the arrow 2.

On the outer face of the wheel is a ring or plate, C, which is secured to the central portion of the wheel and overlaps the annular portion, so that the two parts of the wheel are thus connected together laterally. The plate C, however, is a mere precaution against accidental displacement, for it has no strain to resist under ordinary circumstances.

When the wheel has to be applied to cars for elevated roads I prefer to make the tread K separate from the annular portion of the wheel and of vulcanized fiber, or of other suitable material which will prevent the noise caused by the traversing of ordinary wheels over rails.

The annular portion of the wheel is recessed to receive this tread, which is confined to its place by an annular plate, H, and bolts I, the nuts L of which are preferably sunk into recesses in the annular portion of the wheel, so that they will not be liable to become loose by jars to which the bolts are subjected.

Figure 3:
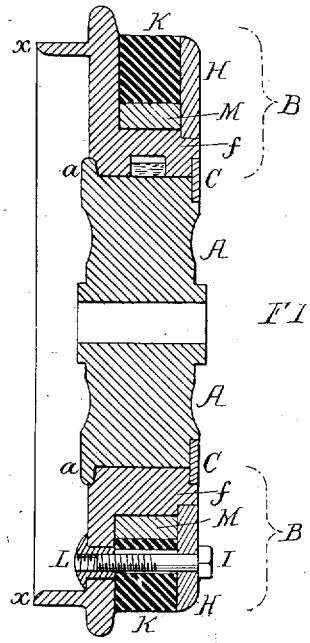

In the modification shown in Fig. 3 the tread K is made of metal, and between it and the rim *f* of the annular portion of the wheel intervenes a ring, M, of rubber or other equivalent noise-absorbing material.

My improvements are especially applicable to wheels with treads made of material tending to deaden noise, as to permit such treads to drag on the rails would soon cause their destruction. For the same reason the treads are not adapted for the application of the brake-shoes, and hence I form on the inner side of the annular portion of the wheel a projecting flange, *x*, on which said brake-shoes act. By this means, also, the brake-beams can be made of less length than the distance between the rails, so that in the event of the breaking of the fastenings of said beams they will fall between instead of on the rails, and accidents will be prevented.

I claim as my invention—

1. A car-wheel in which an annular portion, B, having a tread of sound-deadening material, is combined with a central portion or hub secured to the axle, and on which said annular portion can turn, all substantially as set forth.

2. The combination, in a car-wheel, of the outer annular and flanged portion, B, with the central portion or hub, A, having an extended bearing for the outer portion, which bearing terminates in a flange, *a*, on the same side of the wheel as the flange of the annular portion of the same, as specified.

3. The combination of the recessed annular portion B of the wheel with the tread K, plate H, and bolts I, having nuts sunk into the said portion B of the wheel, as specified.

In testimony whereof I have signed my name to this specification in the presence of two subscribing witnesses.

Witnesses: ENOCH L. TAYLOR.

JAMES F. TOBIN,

HARRY SMITH.